US 6,296,817 B1

(12) United States Patent
Park et al.

(10) Patent No.: US 6,296,817 B1
(45) Date of Patent: Oct. 2, 2001

(54) PROCESS FOR RECYCLING WASTE ALUMINUM DROSS

(76) Inventors: Hyung-Kyu Park, #203-702, Expo APT., Jeunmin-Dong, Yousung-Gu Taejon City; Hoo-In Lee, #104-905, Mugunghwa APT., Wallpyung-Dong, Seo-Gu, Taejon City; Eui-Pak Yoon, 994-2, Whagok 6-Dong, Kangsco-Gu, Seoul, 157-016, all of (KR)

( * ) Notice: Subject to any disclaimer, the term of this patent is extended or adjusted under 35 U.S.C. 154(b) by 0 days.

(21) Appl. No.: 09/404,987

(22) Filed: Sep. 22, 1999

(30) Foreign Application Priority Data

Sep. 22, 1998 (KR) .................................................. 98-39215

(51) Int. Cl.$^7$ ............................... C01F 7/00; C04B 35/00
(52) U.S. Cl. ...................... 423/119; 423/127; 423/131; 75/672; 241/24.13; 501/127
(58) Field of Search .................................... 423/111, 119, 423/131, 657, 629, 127; 241/24.1, 24.13, 24.15; 75/672, 686, 687; 501/127

(56) References Cited

U.S. PATENT DOCUMENTS 5,135,565 * 8/1992 Gens ...................................... 75/672

FOREIGN PATENT DOCUMENTS

98/07467 * 5/1999 (ZA) .

* cited by examiner

Primary Examiner—Steven Bos
(74) Attorney, Agent, or Firm—Nawrocki, Rooney & Sivertson, P.A.

(57) ABSTRACT

Disclosed is the recycling of aluminum dross. Aluminum dross is crushed into particles which are size-classified on the basis of 1 mm. The aluminum dross particles equal to or smaller than 1 mm in size are leached with an aqueous sodium hydroxide solution to give a leachate which contains sodium aluminate as a result of the reaction the aluminum metal of the aluminum dross particles with sodium hydroxide. The aluminum dross particles greater than 1 mm in size are remelted to recover aluminum metal. In the leachate, a small quantity of aluminum hydroxide is seeded, followed by hydrolyzing the sodium aluminate to obtain aluminum hydroxide. Meanwhile, the leachate is filtered to obtain a residue. This residue is subjected to washing, drying and roasting. The mixing of the roasted residue with aggregate and alumina cement gives alumina castable refractories. It is economically very advantageous in that aluminum dross is reused as a raw material for aluminum hydroxide and for alumina castable refractories, instead of being discarded. Also, hydrogen gas can be obtained as a by-product in the process of recycling.

6 Claims, 2 Drawing Sheets

PROCESS FOR RECYCLING WASTE ALUMINUM DROSS

BACKGROUND OF THE INVENTION

1. Field of the Invention

The present invention relates, in general, to a method for recycling aluminum dross, an oxide formed on the surface of the molten aluminum metal, to produce aluminum hydroxide $(Al(OH)_3)$ powder, useful as a material for various aluminum compounds, and castable refractories.

2. Description of Prior Arts

Because aluminum is readily apt to be oxidized, aluminum dross is always produced whether at a large or small amount when aluminum is molten. When aluminum is founded into a base metal after being melted, aluminum dross is removed. When pouring molten aluminum metal into a mold, aluminum dross still remains, in part, in a furnace or a crucible. Even during the casting of molten aluminum metal, aluminum dross is generated at molten metal runners.

Typically, aluminum-melting factories melt aluminum dross by heating and reclaim aluminum metal out of the dross, so as to reduce the amount of aluminum dross to be discarded. Generally, this waste dross is treated by burial in earth. Usually, the waste dross finally produced comprises a predominant amount of aluminum oxide, 10~30% of aluminum metal, around 10% of salts and a mixture of impurities which originally exist in aluminum scraps, such as Mg, Si, Fe and the like.

In the case of treating aluminum dross in a conventional manner, it costs a great deal. For example, a burial site must be secured or a significant amount of money must be paid to waste disposal agents.

In order to prepare aluminum hydroxide, bauxite is conventionally used according to the Bayer process. For example, bauxite is dissolved at a high temperature under a high pressure in a sodium hydroxide (NaOH) solution to lixiviate aluminum oxide out of the ore into the solution, followed by hydrolyzing the solution to prepare aluminum hydroxide.

In this conventional method, a high temperature and a high pressure are required upon the decomposition of the ore, which is usually accomplished in an autoclave. In addition, it is certain that using aluminum dross in preparing aluminum hydroxide is more economically favorable than using bauxite.

SUMMARY OF THE INVENTION

Knowledge of the amphoteric properties of aluminum allows aluminum to be reclaimed from aluminum dross as aluminum hydroxide, leading to the present invention.

As a consequence of the intensive and thorough research on the processing of aluminum dross, repeated by the present inventors, it was found that aluminum can be leached out of aluminum dross by use of an NaOH solution and aluminum hydroxide can be prepared from the solution, whereby its production cost can be considerably reduced relative to where bauxite is used as a raw material.

It was also found that the wastes dross after the preparation of aluminum hydroxide can be converted into castable refractories by oxidizing the residual metal components in the waste dross, whereby the disposal amount and cost of aluminum dross can be reduced.

Therefore, it is an object of the present invention to overcome the problems encountered in prior arts and to provide a method for reusing aluminum dross, which is economically and environmentally favorable.

Based on the present invention, the above object could be accomplished by a provision of a method for treating aluminum dross, comprising the steps of: crusing the aluminum dross into particles; dividing the aluminum dross particles according to particle sizes on the basis of 1 mm; leaching the aluminum dross particles equal to or smaller than 1 mm in size with an aqueous sodium hydroxide solution to give a leachate which contains sodium aluminate as a result of the reaction the aluminum metal of the aluminum dross particles with sodium hydroxide while re-melting the aluminum dross particles greater than 1 mm in size to recover aluminum metal; seeding a small quantity of aluminum hydroxide in the leachate; and hydrolyzing the sodium aluminate to obtain aluminum hydroxide.

In accordance with an embodiment of the present invention, the method further comprises the steps of: filtering the leachate to obtain a residue; washing, drying and roasting said residue; mixing the roasted residue with aggregate and alumina cement to give alumina castable refractories.

BRIEF DESCRIPTION OF THE DRAWINGS

The above and other objects, features and other advantages of the present invention will be more clearly understood from the following detailed description taken in conjunction with the accompanying drawing, in which.

DETAILED DESCRIPTION OF THE INVENTION

Used in the present invention is the aluminum dross from the factories of producing secondary aluminum. That is, after aluminum dross is primarily processed for the reclamation of aluminum metal, the waste dross is the subject of the present invention.

Fundamentally, the present invention takes advantage of the fact that, after classifying aluminum dross by use of sieves, the larger particles contain a relatively large amount of metal while the smaller particles contain a relatively large amount of oxides. Directly from the large particles, aluminum metal can be reclaimed through remelting. On the other hand, the small particles are leached in an NaOH solution to recover segregate aluminum metal out of the dross into aluminum hydroxide while the residue after the leaching is reused as a raw material for castable refractories.

Figure 1:
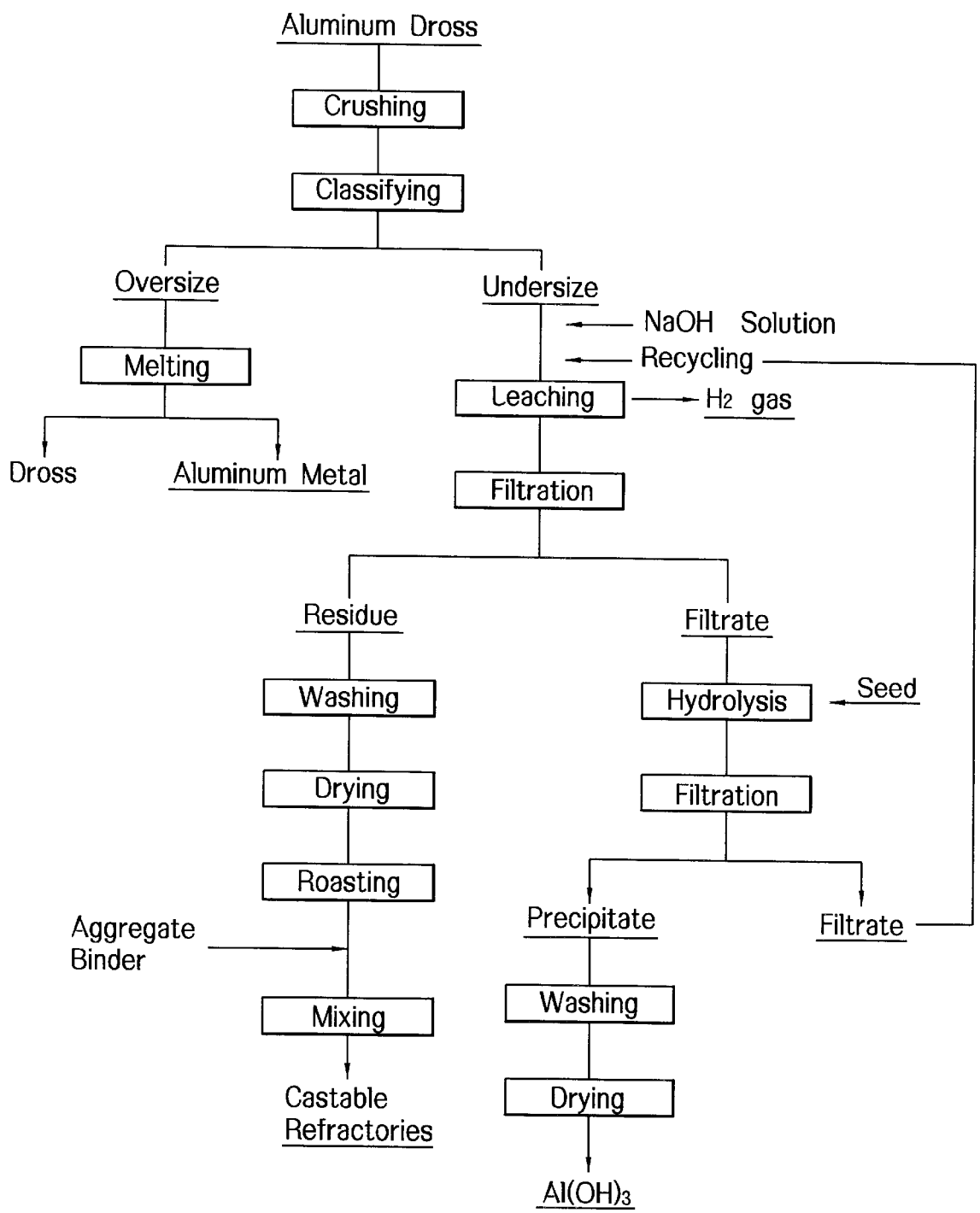
FIG. 1 is a process flow diagram showing the processing of aluminum dross in accordance with the present invention.

With reference to FIG. 1, there is a process flow diagram of recycling aluminum dross.

First, aluminum dross is crushed using a rod mill. Upon crushing, the metal components in the dross are not broken, but so transformed as to give relatively large particles whereas the oxides in the dross are so broken as to give relatively small particles. Thus, aluminum metal can be reclaimed directly from the large particles by remelting.

For the size classification, a Taylor standard sieve with a size of 20 mesh is available. It is difficult to reclaim aluminum from dross particles smaller than 20 mesh (850 $\mu$m) because aluminum metal is held between the dross particles upon melting so that casting is not well conducted and resulting in poor formation of molten metal. Therefore, after the size classification, the pores of undersized dross particles, from which aluminum metal is difficult to obtain, are subjected to aluminum hydroxide production. Whereas, the dross particles which are larger than 20 mesh are remelted to reclaim aluminum metal, thereby improving the melting efficiency and reducing the amount of waste dross. For the melting of the dross particles, a reverberatory furnace or a crucible furnace is useful.

As main components of aluminum dross, aluminum oxide or alumina, and aluminum metal stand. In nature, aluminum oxide exists in a form of $\alpha$-alumina, $\beta$-alumina and $\gamma$-alumina in dependence of the growth temperature and procedure of the crystallization. Aluminum dross is abundant in $\alpha$-alumina.

Aluminum metal itself is an amphoteric element which is melted in both acid and alkali while aluminum oxide is more difficult to melt than aluminum. And, it is more difficult in melting $\alpha$-alumina than $\gamma$-alumina. Thus, as shown in FIG. 1, when aluminum dross is treated with an NaOH solution, the aluminum metal of the aluminum dross is, leached into the aqueous solution whereas most of the alumina oxide remains as a leach residue.

As shown in FIG. 1, when leaching aluminum dross with NaOH, the chemical reaction which occurs in the solution is as follows:

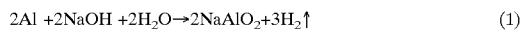

$$2Al + 2NaOH + 2H_2O \rightarrow 2NaAlO_2 + 3H_2\uparrow \quad (1)$$

When leaching bauxite with NaOH according to a conventional method, the chemical reaction is represented by the following equation 2:

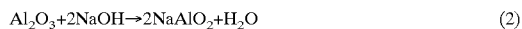

$$Al_2O_3 + 2NaOH \rightarrow 2NaAlO_2 + H_2O \quad (2)$$

As apparent from the above equation 1, the leaching of aluminum dross with NaOH generates hydrogen gas whereas no hydrogen gas is obtained with bauxite. Therefore, in the case of treating aluminum dross according to the present invention, the hydrogen gas generated as a by-product can be advantageously used as a fuel or for the production of hydrogen compounds.

After leaching aluminum dross with an NaOH solution as in equation 1, the resulting solution is filtered. The filtrate, which contains $NaAlO_2$, is then hydrolyzed with stirring. At this moment, a fine $Al(OH)_3$ seed is added at a small amount with the aim of promoting the precipitation of $Al(OH)_3$. This hydrolysis can be represented by the following chemical equation 3:

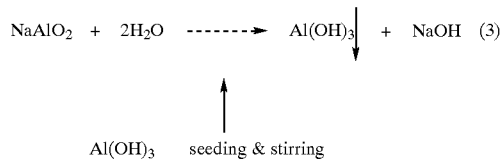

Following the precipitation, the solution is filtered, and the solid is washed and dried to allow $Al(OH)_3$ whereas the liquid is recycled to the process of the equation 1 after being controlled as to its NaOH concentration.

Meanwhile, the residue after leaching aluminum dross with NaOH can be reused as a raw material for ceramics, in accordance with the present invention. Most of the residue is of oxides, but because the existence of a small quantity of metal components is not out of the bounds of possibility, the leached residue is subjected to oxidation in order to convert the remaining metal into oxides. In this regard, the leached residue is roasted after being washed with water and dried, as shown in the process flow of FIG. 1. In this roasting process, the waste dross is heated in a furnace such as a rotary kiln under an oxidative atmosphere for the purpose of converting the residual aluminum and other metal components, such as magnesium, in waste aluminum dross, into oxides.

After undergoing the roasting process, the waste aluminum dross comes to comprise 80% or greater of $Al_2O_3$, so it can be reused as alumina castable refractories of high refractoriness, in combination with alumina-based aggregate and/or cement.

Castable refractories, a kind of moldable refractories, can be prepared into refractory concrete when they are mixed with a binder and refractory aggregate of a proper particle size and added with water. The addition of water causes hydration, providing the refractory concrete with strength. As a binder, alumina cement is usually used.

Alumina castable refractories are widely used as heat resistant materials. For instance, they are applied as interior finishing for structures which are used at high temperatures, various high temperature furnaces, and decking trucks for tunnel kilns.

A better understanding of the present invention may be obtained in light of the following examples which are set forth to illustrate, but are not to be construed to limit the present invention.

EXAMPLE I

Preparation of Aluminum Hydroxide from Waste Aluminum Dross

Used in this example was the aluminum dross from the factories of producing secondary aluminum. It was obtained after aluminum dross was primarily processed for the reclamation of aluminum metal. The aluminum sample was found to comprise approximately 30% of aluminum metal as measured by ICP. The results of this quantitative elementary analysis for the aluminum sample are given in Table 1, below.

TABLE 1

Quantitative Elementary Analysis of Dross Sample

| Elements (wt %) | | | | | | | | | |
|---|---|---|---|---|---|---|---|---|---|
| Mg | Si | Ti | Mn | Fe | Sn | Ni | Ca | K | Na |
| 4.65 | 0.57 | 0.25 | 0.004 | 0.20 | 0.31 | 0.02 | 0.26 | 0.34 | 0.73 |

50 g of NaOH was dissolved in 500 ml of distilled water to give a 10% NaOH leaching solution which was charged with 112.5 g of aluminum dross with a particle size of 20 mesh or smaller, followed by stirring for 2 hours. Upon leaching, a large amount of reaction heat is generated, evaporating the solution. In order to reduce the solution loss due to the evaporation, a condenser was mounted on a leaching vessel. An exhaust tube was additionally installed to guide the hydrogen gas which was produced during the reaction.

Experimentally, it was recognized that the preferred concentration of sodium hydroxide in the leaching solution was 10% to 20% and the preferred pulp density of the dross sample in the leachate ranged from 100 to 200 g/l.

After being filtered, the leachate was taken by 100 ml to deposit aluminum hydroxide in the following cases: an $Al(OH)_3$ seed was added just after the filtration; the seed was added after the filtrate was completely cooled; and no seeds were used. The seed was used at an amount of 1.7 g, respectively.

Deposits were washed and dried according to the process procedure of FIG. 1 and identified to be $Al(OH)_3$ as determined by X-ray diffraction.

The weights of the deposits were measured and the recovery yields by the cases were obtained in consideration of the seed amount added. The recovery yields were obtained on the basis of 19.5 g of $Al(OH)_3$, the theoretically recoverable amount when assuming that the total aluminum metal component of the aluminum dross used was leached and all the leached aluminum was deposited as $Al(OH)_3$.

Using 1.2 N hydrochloric acid, neutralization titration was carried out for the filtrate after the filtration of the leached solution, as well as for the NaOH solution before leaching.

These three experimental results are summarized in Table 2, below.

TABLE 2

Preparation Results of $Al(OH)_3$ from Aluminum Dross

| Deposition | Seed (g) | $Al(OH)_3$ deposited (g) | HCl(ml) titrated* | Recovery Yield (%) |
|---|---|---|---|---|
| Just after filtering | 1.7 | 13.9 | 29 | 71.4 |
| After Cooling | 1.7 | 13.4 | 32.65 | 68.7 |
| Filtrate as it is | 0 | 11.7 | 31.1 | 60 |

*21.2 ml of HCl were consumed for the 10% NaOH solution before leaching.

As apparent from the data of Table 2, at least 60% of the aluminum component contained in aluminum dross can be recovered according to the process of the present invention. As a useful by-product, hydrogen gas was also obtained.

The fact that more 1.2 N HCl was consumed for the filtrate after the filtration of the leached solution than for the NaOH solution before leaching, indicates that the NaOH concentration after leaching is higher than that before leaching and thus, the NaOH solution initially used can be reused.

Figure 2:
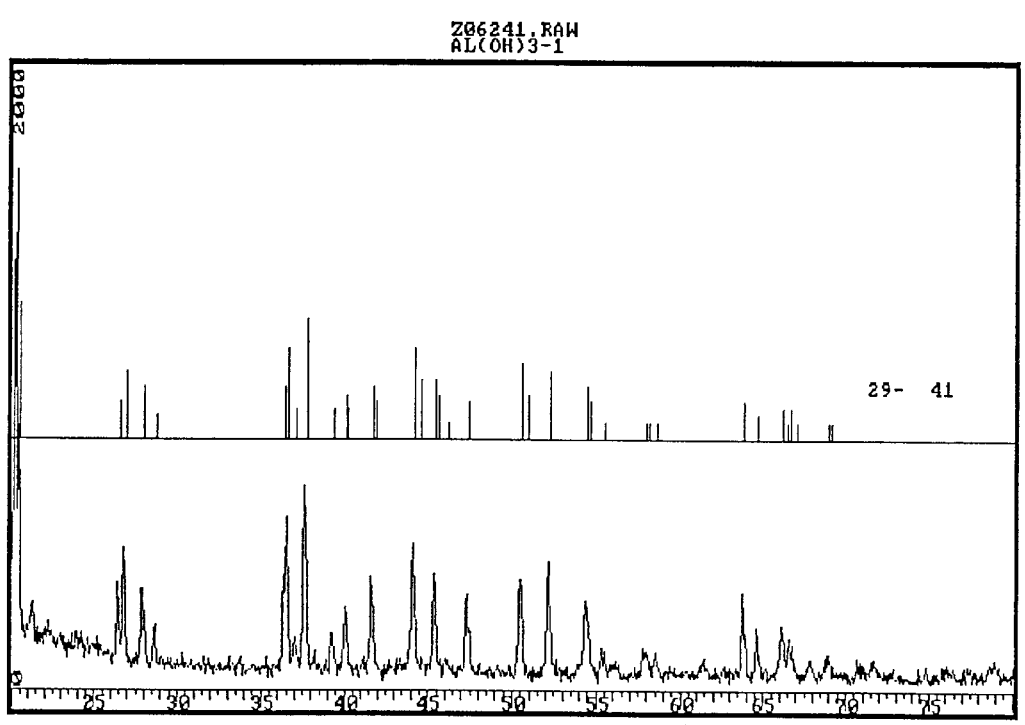
FIG. 2 is an X-ray diffraction curve of the aluminum hydroxide prepared according to the present invention.

FIG. 2 is an X-ray diffraction curve, which demonstrates that the compound prepared according to the present invention is $Al(OH)_3$, on the basis of the $Al(OH)_3$ characteristic peaks denoted by '29–41'.

The aluminum hydroxide thus obtained can be used to prepare various aluminum compounds.

EXAMPLE II

Preparation of Alumina Castable Refractories from Waste Aluminum Dross

After the leached solution was filtered, the residue was washed, dried and roasted, according to the process of FIG. 1.

Upon roasting, the metal components in waste dross, such as aluminum and magnesium, were converted into oxides. The roasting was carried out at 900° C. for 1 hour in a rotary kiln while waste dross with a size less than 20 mesh was fed at a rate of 70 g per min.

After roasting, the sample was quantitatively analyzed for aluminum metal, and the result is shown in Table 3, below.

TABLE 3

Al Content of Waste Dross Before and After Roasting

| Al content in Waste Dross (wt %) | |
|---|---|
| Before Roasting | After Roast |
| 34 | 0.61 |

Only a trace amount of aluminum metal remained in the sample after the roasting, as demonstrated in Table 3.

An examination was made on the oxide content of the roasted dross and the results are given in a Table 4, below.

TABLE 4

Composition of Waste Aluminum Dross After Roasting

| Composition (wt %) | | | | | | | | |
|---|---|---|---|---|---|---|---|---|
| $SiO_2$ | $Al_2O_3$ | $Fe_2O_3$ | CaO | MgO | $K_2O$ | $N_2O_3$ | $TiO_2$ | MnO |
| 1.45 | 84.46 | 0.64 | 0.48 | 10.0 | 0.03 | 1.15 | 0.78 | 0.02 |

It is apparent from the Table 4 that most of the metal components of waste dross can be converted into oxides and thus, waste dross can be reused as alumina refractory materials or other ceramic materials.

Castable refractories for testing were prepared by mixing waste aluminum dross with aggregate and alumina cement. The aggregate used in the example was a kind of chamotte aggregate, consisting mainly of $SiO_2$, $Al_2O_3$, and $3Al_2O_3.2SiO_2$. This aggregate was classified according to its particle sizes: coarse (2.0~4.0 mm); medium (0.074~2.0 mm); and fine (0.074 mm or less). For the alumina cement, a commercially available product with an alumina content of 50% or more was selected.

Alternatively, the alumina cement or the aggregate was replaced, in part, with the roasted dross. In the case of aggregate, the roasted dross was used instead of the fine aggregate with a size of 0.074 mm or less.

After determining mixing ratios of the components for castable refractories, the amount of water to be consumed was measured. According to KS-L-3503, there were prepared specimens for testing the strength of castable refractories. The specimens were measured for compressive strength, bending strength and linear shrinkage rate. The specimens are cuboids with a dimension of 4 cm×4 cm×16 cm. After being molded, the specimens were cured at 22° C. for 24 hours, dried at 110° C. for 10 hours, and sintered at two temperatures 1,000° C. and 1,350° C.

The material mixing ratios of the castable refractories are summarized in Table 5, below and the test results according to KS-L-3503 are shown in Table 6.

TABLE 5

Material Mixing Ratios of Castable Refractories

| Sample | Binder (%) | | Chamotte Aggregate (%) | | | Water added (%) |
|---|---|---|---|---|---|---|
| | Al cement | Al dross | 4.0–2.0 (mm) | 2.0–0.074 (mm) | ≦0.074 (mm) | |
| AD-0 | 15.0 | — | | | | |
| AD-10 | 13.5 | 1.5 | 40.0 | 30.0 | 15.0 | Depends on workability |
| AD-20 | 12.0 | 3.0 | | | | |
| AD-30 | 10.5 | 4.5 | | | | |
| CD-0 | 15.0 | — | 40.0 | 30.0 | 15.0 | |

TABLE 5-continued

Material Mixing Ratios of Castable Refractories

| | Binder (%) | | Chamotte Aggregate (%) | | | |
|---|---|---|---|---|---|---|
| Sample | Al cement | Al dross | 4.0–2.0 (mm) | 2.0–0.074 (mm) | ≦0.074 (mm) | Water added (%) |
| CD-5 | 15.0 | 5.0 | 40.0 | 30.0 | 10.0 | Depends on |
| CD-10 | 15.0 | 10.0 | 40.0 | 30.0 | 5.0 | workability |
| CD-15 | 15.0 | 15.0 | 40.0 | 30.0 | — | |

TABLE 6

Physical Properties of Castable Refractories

| | | Substitutes for Al Cement | | | | Substitutes for Aggregate | | | |
|---|---|---|---|---|---|---|---|---|---|
| Properties | | AD-0 | AD-10 | AD-20 | AD-30 | CD-0 | CD-5 | CD-10 | CD-15 |
| Water added (%) | | 13.0 | 13.3 | 13.7 | 14.0 | 13.0 | 14.2 | 15.4 | 16.7 |
| Bench Time (Min) | | 85 | 80 | 60 | 45 | 85 | 70 | 55 | 40 |
| Cure Str. (kg/cm$^2$) | Comp. Str. | 563 | 421 | 375 | 288 | 563 | 426 | 348 | 278 |
| | Flex. Str. | 63.2 | 52.7 | 41.0 | 38.6 | 63.2 | 54.0 | 41.8 | 34.0 |
| Linear Shrinkage rate (%) | 110° C. × 24 h | 0 | −0.03 | −0.03 | −0.03 | 0.03 | 0.03 | −0.03 | −0.03 |
| | 1,000° C. × 3 h | −0.06 | −0.03 | −0.12 | −0.06 | −0.06 | −0.06 | −0.12 | <0.12 |
| | 1,350° C. × 3 h | −0.06 | −0.09 | −0.12 | −0.16 | −0.06 | −0.06 | −0.16 | −0.19 |
| Comp. Strength (kg/cm$^2$) | 110° C. × 24 h | 270 | 239 | 151 | 122 | 270 | 225 | 194 | 143 |
| | 1,000° C. × 3 h | 213 | 153 | 120 | 99 | 213 | 149 | 127 | 87 |
| | 1,350° C. × 3 h | 275 | 207 | 201 | 155 | 275 | 207 | 132 | 102 |
| Bending Strength (kg/cm$^2$) | 110° C. × 24 h | 50.3 | 38.6 | 30.4 | 18.7 | 50.3 | 37.5 | 30.4 | 25.0 |
| | 1,000° C. × 3 h | 37.5 | 22.3 | 18.7 | 14.0 | 37.5 | 16.4 | 14.0 | 9.4 |
| | 1,350° C. × 3 h | 71.4 | 65.5 | 56.2 | 43.3 | 71.4 | 67.9 | 44.5 | 35.1 |
| Vol. Specific Gravity | 110° C. × 24 h | 2.05 | 2.01 | 2.00 | 1.99 | 2.05 | 2.02 | 2.00 | 1.95 |
| | 1,000° C. × 3 h | 1.97 | 1.94 | 1.94 | 1.93 | 1.97 | 1.93 | 1.92 | 1.88 |
| | 1,350° C. × 3 h | 1.98 | 1.96 | 1.95 | 1.95 | 1.98 | 1.95 | 1.92 | 1.89 |
| Porosity (%) | 110° C. × 24 h | 18.2 | 19.7 | 20.6 | 21.5 | 18.2 | 19.7 | 21.4 | 23.9 |
| | 1,000° C. × 3 h | 22.2 | 22.4 | 22.3 | 22.6 | 22.2 | 24.0 | 25.9 | 28.3 |
| | 1,350° C. × 3 h | 24.7 | 25.7 | 25.7 | 26.0 | 24.7 | 26.4 | 27.8 | 29.6 |

In Table 5, the letters "AD" and "CD" represent specimens in which alumina cement and chamotte aggregate are replaced, in part, with aluminum dross, respectively. The numerals attached to the letters express the percentages of the replacing aluminum dross for aggregate or binder. The specimens all were based on a mixing ratio of 85:15 of aggregate:aluminum cement, the usually found mixing ratio in commercially available castable refractories. Thus, in Tables 5 and 6, for example, AD-0 and CD-0 are the same specimen which comprises aggregate of three particle sizes and alumina cement at the base mixing ratio without the replacing aluminum dross. AD-10, AD-20 and AD-30 are specimens in which aluminum dross replaces, in part, alumina cement at a quantity of 10%, 20% and 30%, respectively. On the other hand, CD-5, CD-10 and CD-15 are the specimens in which aluminum dross replaces the finest aggregate at a quantity of 3%, 67% and 100%, respectively.

In Table 6, the term "bench time" means the period of time for which the dough obtained by mixing castable formulation materials with water retains available fluidity.

As a consequence of a physical property test, all of the specimens, except for AD-30, were found to sufficiently meet the standards of KS-L-3511: linear shrinkage rate within ±1.0%; bending strength after drying at 110° C. equal to or greater than 25 kgf/cm$^2$; and compressive strength equal to or greater than 25 kgf/cm$^2$.

In Table 6, the 110° C.×24 h rows contain the physical properties of the castable specimens after drying. As apparent from the data of Table 6, it is preferable that aluminum dross, if used, replaces the fine aggregate while amounting up to 15 wt % based on the total weight of the castable refractory. As being suggested for reference, the test results for the shrinkage rate and strength at both 1,000° C. and 1,350° C. demonstrate that higher strength can be obtained at 1,350° C. than at 1,000° C. The reason is that the water within the hydrates which are formed while the alumina cement, serving as a binder, is cured, is decomposed at 1,000° C. to weaken the strength of the castable refractory, but sintering at 1,350° C. allows the agglomeration of the aggregate, increasing the strength.

Taken together, the data obtained in the above examples show that aluminum dross can be reused as a material for alumina castable refractories, in accordance with the present invention.

As described hereinbefore, aluminum dross, which is usually generated when melting aluminum, is used to obtain aluminum hydroxide and alumina castable refractories. The leaching of aluminum dross with NaOH allows aluminum metal to be extracted in an aluminum hydroxide form therefrom. Therefore, the present invention has a significant advantage over conventional methods in an economical aspect because aluminum dross, a waste material, is much cheaper than bauxite, which is used as a raw material for aluminum hydroxide in conventional methods. In addition, in contrast to conventional methods, the present invention does not require autoclaving in the process of preparing aluminum hydroxide, so the cost of equipment can be saved. Further, hydrogen which is generate as a by-product when leaching the aluminum metal of aluminum dross in an NaOH solution, can be reused.

The leached residue of aluminum dross, if undergoing a process series of washing, drying and roasting according to the present invention, can be used as a material for alumina castable refractories. Therefore, the present invention can significantly reduce the amount of the waste aluminum dross to be discarded, contributing to saving the treatment cost of the waste aluminum dross as well as to preventing pollution of the environment. Also, the alumina castable refractories could be decreased in production cost.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A process for recycling of waste aluminum dross, comprising the steps of:

crushing the aluminum dross into particles;

classifying the aluminum dross particles according to particle sizes;

leaching the aluminum dross particles equal to or smaller than 1 millimeter in size with an aqueous sodium hydroxide solution to give a leachate which contains sodium aluminate as a product of the reaction of the aluminum metal remaining in the aluminum dross particles with sodium hydroxide;

seeding a small quantity of aluminum hydroxide in the leachate; and hydrolyzing the sodium aluminate to obtain aluminum hydroxide.

2. A method as set forth in claim 1, wherein said leaching step comprises a chemical reaction in which said aqueous sodium hydroxide solution is reacted with the aluminum metal of said aluminum dross to produce hydrogen gas as a by-product.

3. A method as set forth in claim 2, wherein said leaching step is carried out in such a way that said sodium hydroxide solution has a concentration of 10~20% and said aluminum dross in said leachate has a pulp density of 100~200 g/l.

4. A method as set forth in claim 1, further comprising the steps of: filtering the leachate to obtain a residue; washing, drying and roasting said residue; mixing the roasted residue with aggregate and alumina cement to give alumina castable refractories.

5. A method as set forth in claim 4, wherein said aggregate is replaced, in part, with said aluminum dross within an amount of 15 wt % based on the total weight of the alumina castable refractory.

6. A method as set forth in claim 1, wherein the method further comprises the step of: re-melting the aluminum dross particles greater than 1 millimeter in size to recover aluminum metal.

* * * * *